United States Patent
Welscher et al.

(10) Patent No.: US 12,228,803 B2
(45) Date of Patent: Feb. 18, 2025

(54) COMPUTER IMPLEMENTED METHOD OF DETERMINING A BASE CURVE FOR A SPECTACLE LENS AND METHOD OF MANUFACTURING A SPECTACLE LENS

(71) Applicant: Carl Zeiss Vision International GmbH, Aalen (DE)

(72) Inventors: Markus Welscher, Rainau (DE); Helmut Wietschorke, Aalen (DE); Ralf-Roland Sauer, Hüttlingen (DE); Christoph Winter, Hüttlingen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 236 days.

(21) Appl. No.: 16/657,497

(22) Filed: Oct. 18, 2019

(65) Prior Publication Data

US 2020/0050020 A1 Feb. 13, 2020

Related U.S. Application Data

(63) Continuation of application No. PCT/EP2018/060324, filed on Apr. 23, 2018, which
(Continued)

(51) Int. Cl.
*G02C 7/00* (2006.01)
*G02C 7/02* (2006.01)
*G02C 7/06* (2006.01)

(52) U.S. Cl.
CPC .............. *G02C 7/028* (2013.01); *G02C 7/02* (2013.01); *G02C 7/027* (2013.01); *G02C 7/063* (2013.01); *G02C 2202/08* (2013.01)

(58) Field of Classification Search
CPC ...... G02C 7/027; G02C 13/003; G02C 7/028; G02C 2202/08; G02C 7/024; G02C 7/025; A61B 3/10; A61B 3/111
(Continued)

(56) References Cited

U.S. PATENT DOCUMENTS 2,021,812 A 11/1935 Sterling
3,434,781 A 3/1969 Davis et al.
(Continued)

FOREIGN PATENT DOCUMENTS

CN 101893768 A 11/2010
DE 102014213393 A1 1/2016
(Continued)

OTHER PUBLICATIONS

Office action by the Chinese Intellectual Property Office issued in Chinese patent application Cn 201880026234.X, which is a counterpart hereof, mailed Jun. 1, 2020, and English-language translation thereof.
(Continued)

*Primary Examiner* — Henry Duong
(74) *Attorney, Agent, or Firm* — Tautz & Schuhmacher LLC; Georg Hasselmann (57) ABSTRACT

A computer-implemented method of determining a base curve value representing a base curve for a front surface of a spectacle lens is disclosed. The method includes receiving individual prescription data and determining the base curve value for the front surface of the spectacle lens based on the prescription data. In particular, the base curve value is calculated from the received prescription data based on a functional relationship between one or more values included in the prescription data and the base curve value.

7 Claims, 4 Drawing Sheets

Related U.S. Application Data is a continuation of application No. 15/494,151, filed on Apr. 21, 2017, now abandoned.

(58) Field of Classification Search
USPC .................................................... 359/159.75
See application file for complete search history.

(56) References Cited

U.S. PATENT DOCUMENTS

| | | | |
|---|---|---|---|
| 3,645,610 | A | 2/1972 | Duckwall et al. |
| 8,002,404 | B2 | 8/2011 | Weatherby |
| 8,157,618 | B2 | 4/2012 | Shibata |
| 8,313,194 | B2 | 11/2012 | Colas et al. |
| 8,381,408 | B2 * | 2/2013 | Dubois ................ G02C 13/003 33/200 |
| 9,733,492 | B2 | 8/2017 | Michels et al. |
| 2003/0169398 | A1 * | 9/2003 | Perrott ..................... G02C 7/02 351/41 |
| 2008/0273170 | A1 | 11/2008 | Watanabe |
| 2010/0283966 | A1 | 11/2010 | Colas et al. |
| 2010/0296048 | A1 * | 11/2010 | Weatherby ............... G02C 7/02 351/159.73 |
| 2011/0066276 | A1 | 3/2011 | Dubois et al. |
| 2012/0008090 | A1 * | 1/2012 | Atheimer ................ G02C 7/027 |
| 2012/0086910 | A1 | 4/2012 | Kato et al. |
| 2016/0011437 | A1 * | 1/2016 | Nishimura ........... G02C 13/005 351/204 |
| 2016/0103335 | A1 * | 4/2016 | Ben-Shahar ............. G02C 1/00 351/158 |
| 2017/0102555 | A1 | 4/2017 | Michels et al. |

FOREIGN PATENT DOCUMENTS

| | | |
|---|---|---|
| EP | 2075087 A1 | 7/2009 |
| EP | 2253990 A1 | 11/2010 |
| EP | 3355100 A1 | 8/2018 |
| EP | 3410178 A1 | 12/2018 |
| GB | 1055541 A | 1/1967 |
| WO | 2018138216 A2 | 8/2018 |
| WO | 2018220203 A2 | 12/2018 |

OTHER PUBLICATIONS

Extended European search report issued by the European Patent Office in European patent application EP19212920.3, which is a counterpart hereof, mailed Jul. 29, 2020.

Office action by the Chinese Intellectual Property Office issued in Chinese patent application Cn 201880026234.X, which is a counterpart hereof, mailed Jan. 29, 2021, and English-language translation thereof.

"Ophthalmic optics—Spectacle lenses—Vocabulary (ISO 13666:2012)," German and English version EN ISO 13666:2012, Oct. 2013.

International search report issued in international application PCT/EP2018/060324, to which this application claims priority, mailed Dec. 4, 2018.

International preliminary examination report issued in international application PCT/EP2018/060324, mailed Aug. 13, 2019.

Examination Report by the European Patent Office issued in European patent application EP 18724472.8, which is a counterpart hereof, mailed Aug. 24, 2022 (in English).

* cited by examiner

| Sph\cyl | 0.00 | 0.25 | 0.50 | 0.75 | 1.00 | 1.25 | 1.50 | 1.75 | 2.00 | 2.25 | 2.50 | 2.75 | 3.00 | 3.25 | 3.50 | 3.75 | 4.00 |
|---|---|---|---|---|---|---|---|---|---|---|---|---|---|---|---|---|---|
| -8.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |
| -7.75 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |
| -7.50 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |
| -7.25 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |
| -7.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |
| -6.75 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |
| -6.50 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |
| -6.25 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |
| -6.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |
| -5.75 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |
| -5.50 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |
| -5.25 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |
| -5.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |
| -4.75 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| -4.50 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| -4.25 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| -4.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| -3.75 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| -3.50 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| -3.25 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| -3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| -2.75 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| -2.50 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| -2.25 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| -2.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 | 5.25 | 5.25 |
| -1.75 | 4.00 | 4.00 | 4.00 | 4.00 | 4.00 | 4.00 | 4.00 | 4.00 | 4.00 | 4.00 | 4.00 | 4.00 | 4.00 | 4.00 | 5.25 | 5.25 | 5.25 |
| -1.50 | 4.00 | 4.00 | 4.00 | 4.00 | 4.00 | 4.00 | 4.00 | 4.00 | 4.00 | 4.00 | 4.00 | 4.00 | 5.25 | 5.25 | 5.25 | 5.25 | 5.25 |
| -1.25 | 4.00 | 4.00 | 4.00 | 4.00 | 4.00 | 4.00 | 4.00 | 4.00 | 4.00 | 4.00 | 4.00 | 4.00 | 5.25 | 5.25 | 5.25 | 5.25 | 5.25 |
| -1.00 | 4.00 | 4.00 | 4.00 | 4.00 | 4.00 | 4.00 | 4.00 | 4.00 | 4.00 | 4.00 | 4.00 | 5.25 | 5.25 | 5.25 | 5.25 | 5.25 | 5.25 |
| -0.75 | 4.00 | 4.00 | 4.00 | 4.00 | 4.00 | 4.00 | 4.00 | 4.00 | 4.00 | 4.00 | 5.25 | 5.25 | 5.25 | 5.25 | 5.25 | 5.25 | 6.50 |
| -0.50 | 4.00 | 4.00 | 4.00 | 4.00 | 4.00 | 4.00 | 4.00 | 4.00 | 4.00 | 5.25 | 5.25 | 5.25 | 5.25 | 5.25 | 5.25 | 6.50 | 6.50 |
| -0.25 | 4.00 | 4.00 | 4.00 | 4.00 | 4.00 | 4.00 | 4.00 | 4.00 | 5.25 | 5.25 | 5.25 | 5.25 | 5.25 | 5.25 | 6.50 | 6.50 | 6.50 |
| 0.00 | 4.00 | 4.00 | 4.00 | 4.00 | 4.00 | 4.00 | 4.00 | 5.25 | 5.25 | 5.25 | 5.25 | 5.25 | 5.25 | 6.50 | 6.50 | 6.50 | 6.50 |
| 0.25 | 4.00 | 4.00 | 4.00 | 4.00 | 4.00 | 4.00 | 5.25 | 5.25 | 5.25 | 5.25 | 5.25 | 5.25 | 6.50 | 6.50 | 6.50 | 6.50 | 6.50 |
| 0.50 | 4.00 | 4.00 | 4.00 | 4.00 | 4.00 | 5.25 | 5.25 | 5.25 | 5.25 | 5.25 | 5.25 | 6.50 | 6.50 | 6.50 | 6.50 | 6.50 | 6.50 |
| 0.75 | 4.00 | 4.00 | 4.00 | 4.00 | 5.25 | 5.25 | 5.25 | 5.25 | 5.25 | 5.25 | 6.50 | 6.50 | 6.50 | 6.50 | 6.50 | 6.50 | 8.00 |
| 1.00 | 4.00 | 4.00 | 4.00 | 5.25 | 5.25 | 5.25 | 5.25 | 5.25 | 5.25 | 6.50 | 6.50 | 6.50 | 6.50 | 6.50 | 6.50 | 8.00 | 8.00 |
| 1.25 | 4.00 | 4.00 | 5.25 | 5.25 | 5.25 | 5.25 | 5.25 | 5.25 | 6.50 | 6.50 | 6.50 | 6.50 | 6.50 | 6.50 | 8.00 | 8.00 | 8.00 |
| 1.50 | 4.00 | 5.25 | 5.25 | 5.25 | 5.25 | 5.25 | 5.25 | 6.50 | 6.50 | 6.50 | 6.50 | 6.50 | 6.50 | 8.00 | 8.00 | 8.00 | 8.00 |
| 1.75 | 5.25 | 5.25 | 5.25 | 5.25 | 5.25 | 5.25 | 6.50 | 6.50 | 6.50 | 6.50 | 6.50 | 6.50 | 8.00 | 8.00 | 8.00 | 8.00 | 8.00 |
| 2.00 | 5.25 | 5.25 | 5.25 | 5.25 | 5.25 | 6.50 | 6.50 | 6.50 | 6.50 | 6.50 | 6.50 | 8.00 | 8.00 | 8.00 | 8.00 | 8.00 | 8.00 |
| 2.25 | 5.25 | 5.25 | 5.25 | 5.25 | 6.50 | 6.50 | 6.50 | 6.50 | 6.50 | 6.50 | 8.00 | 8.00 | 8.00 | 8.00 | 8.00 | 8.00 | 8.00 |
| 2.50 | 5.25 | 5.25 | 5.25 | 6.50 | 6.50 | 6.50 | 6.50 | 6.50 | 6.50 | 8.00 | 8.00 | 8.00 | 8.00 | 8.00 | 8.00 | 8.00 | 8.00 |
| 2.75 | 5.25 | 5.25 | 6.50 | 6.50 | 6.50 | 6.50 | 6.50 | 6.50 | 8.00 | 8.00 | 8.00 | 8.00 | 8.00 | 8.00 | 8.00 | 8.00 | 8.00 |
| 3.00 | 5.25 | 6.50 | 6.50 | 6.50 | 6.50 | 6.50 | 6.50 | 8.00 | 8.00 | 8.00 | 8.00 | 8.00 | 8.00 | 8.00 | 8.00 | 8.00 | 8.00 |
| 3.25 | 6.50 | 6.50 | 6.50 | 6.50 | 6.50 | 6.50 | 8.00 | 8.00 | 8.00 | 8.00 | 8.00 | 8.00 | 8.00 | 8.00 | 8.00 | | |
| 3.50 | 6.50 | 6.50 | 6.50 | 6.50 | 6.50 | 8.00 | 8.00 | 8.00 | 8.00 | 8.00 | 8.00 | 8.00 | 8.00 | 8.00 | 8.00 | | |
| 3.75 | 6.50 | 6.50 | 6.50 | 6.50 | 8.00 | 8.00 | 8.00 | 8.00 | 8.00 | 8.00 | 8.00 | 8.00 | 8.00 | 8.00 | | | |
| 4.00 | 6.50 | 6.50 | 6.50 | 8.00 | 8.00 | 8.00 | 8.00 | 8.00 | 8.00 | 8.00 | 8.00 | 8.00 | 8.00 | | | | |
| 4.25 | 6.50 | 6.50 | 8.00 | 8.00 | 8.00 | 8.00 | 8.00 | 8.00 | 8.00 | 8.00 | 8.00 | 8.00 | | | | | |
| 4.50 | 6.50 | 8.00 | 8.00 | 8.00 | 8.00 | 8.00 | 8.00 | 8.00 | 8.00 | 8.00 | 8.00 | | | | | | |
| 4.75 | 8.00 | 8.00 | 8.00 | 8.00 | 8.00 | 8.00 | 8.00 | 8.00 | 8.00 | 8.00 | | | | | | | |
| 5.00 | 8.00 | 8.00 | 8.00 | 8.00 | 8.00 | 8.00 | 8.00 | 8.00 | 8.00 | | | | | | | | |
| 5.25 | 8.00 | 8.00 | 8.00 | 8.00 | 8.00 | 8.00 | 8.00 | 8.00 | | | | | | | | | |
| 5.50 | 8.00 | 8.00 | 8.00 | 8.00 | 8.00 | 8.00 | 8.00 | | | | | | | | | | |
| 5.75 | 8.00 | 8.00 | 8.00 | 8.00 | 8.00 | 8.00 | 8.00 | | | | | | | | | | |
| 6.00 | 8.00 | 8.00 | 8.00 | 8.00 | 8.00 | 8.00 | | | | | | | | | | | |
| 6.25 | 8.00 | 8.00 | 8.00 | 8.00 | 8.00 | | | | | | | | | | | | |
| 6.50 | 8.00 | 8.00 | 8.00 | 8.00 | | | | | | | | | | | | | |
| 6.75 | 8.00 | 8.00 | 8.00 | | | | | | | | | | | | | | |
| 7.00 | 8.00 | | | | | | | | | | | | | | | | |

FIG. 4

| Sph\cyl | 0.00 | 0.25 | 0.50 | 0.75 | 1.00 | 1.25 | 1.50 | 1.75 | 2.00 | 2.25 | 2.50 | 2.75 | 3.00 | 3.25 | 3.50 | 3.75 | 4.00 |
|---|---|---|---|---|---|---|---|---|---|---|---|---|---|---|---|---|---|
| -8.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 |
| -7.75 | 1.10 | 1.10 | 1.10 | 1.10 | 1.10 | 1.10 | 1.10 | 1.10 | 1.10 | 1.10 | 1.10 | 1.10 | 1.10 | 1.10 | 1.10 | 1.10 | 1.10 |
| -7.50 | 1.20 | 1.20 | 1.20 | 1.20 | 1.20 | 1.20 | 1.20 | 1.20 | 1.20 | 1.20 | 1.20 | 1.20 | 1.20 | 1.20 | 1.20 | 1.20 | 1.20 |
| -7.25 | 1.30 | 1.30 | 1.30 | 1.30 | 1.30 | 1.30 | 1.30 | 1.30 | 1.30 | 1.30 | 1.30 | 1.30 | 1.30 | 1.30 | 1.30 | 1.30 | 1.30 |
| -7.00 | 1.40 | 1.40 | 1.40 | 1.40 | 1.40 | 1.40 | 1.40 | 1.40 | 1.40 | 1.40 | 1.40 | 1.40 | 1.40 | 1.40 | 1.40 | 1.40 | 1.40 |
| -6.75 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| -6.50 | 1.60 | 1.60 | 1.60 | 1.60 | 1.60 | 1.60 | 1.60 | 1.60 | 1.60 | 1.60 | 1.60 | 1.60 | 1.60 | 1.60 | 1.60 | 1.60 | 1.60 |
| -6.25 | 1.70 | 1.70 | 1.70 | 1.70 | 1.70 | 1.70 | 1.70 | 1.70 | 1.70 | 1.70 | 1.70 | 1.70 | 1.70 | 1.70 | 1.70 | 1.70 | 1.70 |
| -6.00 | 1.80 | 1.80 | 1.80 | 1.80 | 1.80 | 1.80 | 1.80 | 1.80 | 1.80 | 1.80 | 1.80 | 1.80 | 1.80 | 1.80 | 1.80 | 1.80 | 1.80 |
| -5.75 | 1.90 | 1.90 | 1.90 | 1.90 | 1.90 | 1.90 | 1.90 | 1.90 | 1.90 | 1.90 | 1.90 | 1.90 | 1.90 | 1.90 | 1.90 | 1.90 | 1.90 |
| -5.50 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |
| -5.25 | 2.10 | 2.10 | 2.10 | 2.10 | 2.10 | 2.10 | 2.10 | 2.10 | 2.10 | 2.10 | 2.10 | 2.10 | 2.10 | 2.10 | 2.10 | 2.10 | 2.10 |
| -5.00 | 2.20 | 2.20 | 2.20 | 2.20 | 2.20 | 2.20 | 2.20 | 2.20 | 2.20 | 2.20 | 2.20 | 2.20 | 2.20 | 2.20 | 2.20 | 2.20 | 2.20 |
| -4.75 | 2.30 | 2.30 | 2.30 | 2.30 | 2.30 | 2.30 | 2.30 | 2.30 | 2.30 | 2.30 | 2.30 | 2.30 | 2.30 | 2.30 | 2.30 | 2.30 | 2.30 |
| -4.50 | 2.43 | 2.43 | 2.43 | 2.43 | 2.43 | 2.43 | 2.43 | 2.43 | 2.43 | 2.43 | 2.43 | 2.43 | 2.43 | 2.43 | 2.43 | 2.43 | 2.43 |
| -4.25 | 2.56 | 2.56 | 2.56 | 2.56 | 2.56 | 2.56 | 2.56 | 2.56 | 2.56 | 2.56 | 2.56 | 2.56 | 2.56 | 2.56 | 2.56 | 2.56 | 2.56 |
| -4.00 | 2.69 | 2.69 | 2.69 | 2.69 | 2.69 | 2.69 | 2.69 | 2.69 | 2.69 | 2.69 | 2.69 | 2.69 | 2.69 | 2.69 | 2.69 | 2.69 | 2.69 |
| -3.75 | 2.81 | 2.81 | 2.81 | 2.81 | 2.81 | 2.81 | 2.81 | 2.81 | 2.81 | 2.81 | 2.81 | 2.81 | 2.81 | 2.81 | 2.81 | 2.81 | 2.81 |
| -3.50 | 2.94 | 2.94 | 2.94 | 2.94 | 2.94 | 2.94 | 2.94 | 2.94 | 2.94 | 2.94 | 2.94 | 2.94 | 2.94 | 2.94 | 2.94 | 2.94 | 2.94 |
| -3.25 | 3.07 | 3.07 | 3.07 | 3.07 | 3.07 | 3.07 | 3.07 | 3.07 | 3.07 | 3.07 | 3.07 | 3.07 | 3.07 | 3.07 | 3.07 | 3.07 | 3.07 |
| -3.00 | 3.20 | 3.20 | 3.20 | 3.20 | 3.20 | 3.20 | 3.20 | 3.20 | 3.20 | 3.20 | 3.20 | 3.20 | 3.20 | 3.20 | 3.20 | 3.20 | 3.20 |
| -2.75 | 3.33 | 3.33 | 3.33 | 3.33 | 3.33 | 3.33 | 3.33 | 3.33 | 3.33 | 3.33 | 3.33 | 3.33 | 3.33 | 3.33 | 3.33 | 3.33 | 3.63 |
| -2.50 | 3.47 | 3.47 | 3.47 | 3.47 | 3.47 | 3.47 | 3.47 | 3.47 | 3.47 | 3.47 | 3.47 | 3.47 | 3.47 | 3.47 | 3.47 | 3.69 | 4.00 |
| -2.25 | 3.60 | 3.60 | 3.60 | 3.60 | 3.60 | 3.60 | 3.60 | 3.60 | 3.60 | 3.60 | 3.60 | 3.60 | 3.60 | 3.60 | 3.75 | 4.00 | 4.21 |
| -2.00 | 3.73 | 3.73 | 3.73 | 3.73 | 3.73 | 3.73 | 3.73 | 3.73 | 3.73 | 3.73 | 3.73 | 3.73 | 3.73 | 3.81 | 4.00 | 4.21 | 4.42 |
| -1.75 | 3.87 | 3.87 | 3.87 | 3.87 | 3.87 | 3.87 | 3.87 | 3.87 | 3.87 | 3.87 | 3.87 | 3.87 | 3.87 | 4.00 | 4.21 | 4.42 | 4.62 |
| -1.50 | 4.00 | 4.00 | 4.00 | 4.00 | 4.00 | 4.00 | 4.00 | 4.00 | 4.00 | 4.00 | 4.00 | 4.00 | 4.00 | 4.21 | 4.42 | 4.62 | 4.83 |
| -1.25 | 4.00 | 4.00 | 4.00 | 4.00 | 4.00 | 4.00 | 4.00 | 4.00 | 4.00 | 4.00 | 4.00 | 4.00 | 4.21 | 4.42 | 4.62 | 4.83 | 5.04 |
| -1.00 | 4.00 | 4.00 | 4.00 | 4.00 | 4.00 | 4.00 | 4.00 | 4.00 | 4.00 | 4.00 | 4.00 | 4.21 | 4.42 | 4.62 | 4.83 | 5.04 | 5.25 |
| -0.75 | 4.00 | 4.00 | 4.00 | 4.00 | 4.00 | 4.00 | 4.00 | 4.00 | 4.00 | 4.00 | 4.21 | 4.42 | 4.62 | 4.83 | 5.04 | 5.25 | 5.46 |
| -0.50 | 4.00 | 4.00 | 4.00 | 4.00 | 4.00 | 4.00 | 4.00 | 4.00 | 4.00 | 4.21 | 4.42 | 4.62 | 4.83 | 5.04 | 5.25 | 5.46 | 5.67 |
| -0.25 | 4.00 | 4.00 | 4.00 | 4.00 | 4.00 | 4.00 | 4.00 | 4.00 | 4.21 | 4.42 | 4.62 | 4.83 | 5.04 | 5.25 | 5.46 | 5.67 | 5.88 |
| 0.00 | 4.00 | 4.00 | 4.00 | 4.00 | 4.00 | 4.00 | 4.00 | 4.21 | 4.42 | 4.62 | 4.83 | 5.04 | 5.25 | 5.46 | 5.67 | 5.88 | 6.08 |
| 0.25 | 4.00 | 4.00 | 4.00 | 4.00 | 4.00 | 4.00 | 4.21 | 4.42 | 4.62 | 4.83 | 5.04 | 5.25 | 5.46 | 5.67 | 5.88 | 6.08 | 6.29 |
| 0.50 | 4.00 | 4.00 | 4.00 | 4.00 | 4.00 | 4.21 | 4.42 | 4.62 | 4.83 | 5.04 | 5.25 | 5.46 | 5.67 | 5.88 | 6.08 | 6.29 | 6.50 |
| 0.75 | 4.00 | 4.00 | 4.00 | 4.00 | 4.21 | 4.42 | 4.62 | 4.83 | 5.04 | 5.25 | 5.46 | 5.67 | 5.88 | 6.08 | 6.29 | 6.50 | 6.60 |
| 1.00 | 4.00 | 4.00 | 4.00 | 4.21 | 4.42 | 4.62 | 4.83 | 5.04 | 5.25 | 5.46 | 5.67 | 5.88 | 6.08 | 6.29 | 6.50 | 6.60 | 6.70 |
| 1.25 | 4.00 | 4.00 | 4.21 | 4.42 | 4.62 | 4.83 | 5.04 | 5.25 | 5.46 | 5.67 | 5.88 | 6.08 | 6.29 | 6.50 | 6.60 | 6.70 | 6.80 |
| 1.50 | 4.00 | 4.21 | 4.42 | 4.62 | 4.83 | 5.04 | 5.25 | 5.46 | 5.67 | 5.88 | 6.08 | 6.29 | 6.50 | 6.60 | 6.70 | 6.80 | 6.90 |
| 1.75 | 4.21 | 4.42 | 4.62 | 4.83 | 5.04 | 5.25 | 5.46 | 5.67 | 5.88 | 6.08 | 6.29 | 6.50 | 6.60 | 6.70 | 6.80 | 6.90 | 7.00 |
| 2.00 | 4.42 | 4.62 | 4.83 | 5.04 | 5.25 | 5.46 | 5.67 | 5.88 | 6.08 | 6.29 | 6.50 | 6.60 | 6.70 | 6.80 | 6.90 | 7.00 | 7.10 |
| 2.25 | 4.62 | 4.83 | 5.04 | 5.25 | 5.46 | 5.67 | 5.88 | 6.08 | 6.29 | 6.50 | 6.60 | 6.70 | 6.80 | 6.90 | 7.00 | 7.10 | 7.20 |
| 2.50 | 4.83 | 5.04 | 5.25 | 5.46 | 5.67 | 5.88 | 6.08 | 6.29 | 6.50 | 6.60 | 6.70 | 6.80 | 6.90 | 7.00 | 7.10 | 7.20 | 7.30 |
| 2.75 | 5.04 | 5.25 | 5.46 | 5.67 | 5.88 | 6.08 | 6.29 | 6.50 | 6.60 | 6.70 | 6.80 | 6.90 | 7.00 | 7.10 | 7.20 | 7.30 | 7.40 |
| 3.00 | 5.25 | 5.46 | 5.67 | 5.88 | 6.08 | 6.29 | 6.50 | 6.60 | 6.70 | 6.80 | 6.90 | 7.00 | 7.10 | 7.20 | 7.30 | 7.40 | 7.50 |
| 3.25 | 5.46 | 5.67 | 5.88 | 6.08 | 6.29 | 6.50 | 6.60 | 6.70 | 6.80 | 6.90 | 7.00 | 7.10 | 7.20 | 7.30 | 7.40 | 7.50 | |
| 3.50 | 5.67 | 5.88 | 6.08 | 6.29 | 6.50 | 6.60 | 6.70 | 6.80 | 6.90 | 7.00 | 7.10 | 7.20 | 7.30 | 7.40 | 7.50 | | |
| 3.75 | 5.88 | 6.08 | 6.29 | 6.50 | 6.60 | 6.70 | 6.80 | 6.90 | 7.00 | 7.10 | 7.20 | 7.30 | 7.40 | 7.50 | | | |
| 4.00 | 6.08 | 6.29 | 6.50 | 6.60 | 6.70 | 6.80 | 6.90 | 7.00 | 7.10 | 7.20 | 7.30 | 7.40 | 7.50 | | | | |
| 4.25 | 6.29 | 6.50 | 6.60 | 6.70 | 6.80 | 6.90 | 7.00 | 7.10 | 7.20 | 7.30 | 7.40 | 7.50 | | | | | |
| 4.50 | 6.50 | 6.60 | 6.70 | 6.80 | 6.90 | 7.00 | 7.10 | 7.20 | 7.30 | 7.40 | 7.50 | | | | | | |
| 4.75 | 6.60 | 6.70 | 6.80 | 6.90 | 7.00 | 7.10 | 7.20 | 7.30 | 7.40 | 7.50 | | | | | | | |
| 5.00 | 6.70 | 6.80 | 6.90 | 7.00 | 7.10 | 7.20 | 7.30 | 7.40 | 7.50 | | | | | | | | |
| 5.25 | 6.80 | 6.90 | 7.00 | 7.10 | 7.20 | 7.30 | 7.40 | 7.50 | | | | | | | | | |
| 5.50 | 6.90 | 7.00 | 7.10 | 7.20 | 7.30 | 7.40 | 7.50 | | | | | | | | | | |
| 5.75 | 7.00 | 7.10 | 7.20 | 7.30 | 7.40 | 7.50 | | | | | | | | | | | |
| 6.00 | 7.10 | 7.20 | 7.30 | 7.40 | 7.50 | | | | | | | | | | | | |
| 6.25 | 7.20 | 7.30 | 7.40 | 7.50 | | | | | | | | | | | | | |
| 6.50 | 7.30 | 7.40 | 7.50 | | | | | | | | | | | | | | |
| 6.75 | 7.40 | 7.50 | | | | | | | | | | | | | | | |
| 7.00 | 7.50 | | | | | | | | | | | | | | | | |

COMPUTER IMPLEMENTED METHOD OF DETERMINING A BASE CURVE FOR A SPECTACLE LENS AND METHOD OF MANUFACTURING A SPECTACLE LENS

CROSS REFERENCE TO RELATED APPLICATIONS

This application is a continuation application of international patent application PCT/EP2018/060324, filed Apr. 23, 2018, which claims priority to U.S. patent application Ser. No. 15/494,151, filed Apr. 21, 2017, both of which are hereby incorporated by reference in their entireties.

FIELD OF THE DISCLOSURE

The present disclosure relates to a computer-implemented method of determining at least one base curve value representing at least one base curve for a spectacle lens, that is, an ophthalmic lens which is worn in front of the eye without being in contact with the eye. In addition, the disclosure relates to a method of manufacturing a spectacle lens.

BACKGROUND OF THE DISCLOSURE

A free-form surface of a spectacle lens is a surface which may freely be formed during the manufacturing process and which does not need to show axial symmetry or rotational symmetry. In particular, a free-form surface may lead to different dioptric powers (spherical and/or astigmatic) in different sections of the surface. The use of free-form surfaces allows for improving the quality of spectacle lenses with regard to imaging quality experienced by the wearer. For example, by use of a free-form surface a spectacle lens may be optimized in view of the individual prescription data as well as the individual as worn-position of the wearer for whom it is manufactured. The possibility of providing a free-form surface exists for single-vision lenses as well as for multifocal or progressive-power lenses where the term "single-vision lens" refers to a spectacle lens designated to provide a single dioptric power and the term "progressive-power lens" refers to a spectacle lens with at least one progressive surface that provides increasing power as the wearer looks down. A progressive-power lens includes a near portion and a distance portion where the terms "near portion" and "distance portion" refer to that portion of the multifocal or progressive-power lens having the dioptric power for near vision and that portion of a multifocal or progressive-power lens having the dioptric power for distance vision, respectively. The difference between the near power and the distance power experienced by the wearer is called addition power. Between the near portion and the distance portion there is an intermediate corridor in which the power experienced by the wearer decreases from the dioptric power for near vision to the dioptric power for distance vision and in which the vision for the wearer is clear. Free-form surfaces of progressive power lenses include a larger number of parameters, which may be taken into account in the calculation of the surface than in the calculation of the free-form surfaces for single vision lenses, for example, the length of the intermediate corridor, the position of the intermediate corridor or the addition power.

A free-form surface may be located at the front surface or the rear surface of a spectacle lens. However, it is also possible that both the front surface and the rear surface are free form-surfaces. In all three cases there usually exists a set of base curves represented by a base curve value. The base curve value is given by the nominal surface power typically of the front surface. In this context, the surface power is the difference between the refractive index in front and behind the surface multiplied by the curvature of the surface. If the curvature of the surface is not constant, as it is for example the case with a free-form surface, the curvature by which the difference between the refractive index in front and behind the surface is to be multiplied resembles a mean curvature at a reference point of the surface or an average curvature that is averaged over the whole surface. Often, the base curves are given for a nominal refractive index of 1.53, even if the material on which the spectacle lens is made of has another refractive index. In this case, the base curve value needs to be transformed for the actual refractive index for optical calculations. The base curve that is to be used for given prescription data depends at least on the spherical power and/or the cylindrical power of the spectacle lens. If applicable, the base curve to be used may depend on further parameters such as addition power, length of the intermediate corridor, et cetera. Typically, there exist so-called base curve charts which associate a number of base curve values to a number of combinations of spherical power and cylindrical power.

In case of a free-form surface on the rear surface of the spectacle lens the front surface is typically given by a spherical surface as defined by the base curve value and the shape of the free-form surface is configured such that the dioptric power according to the prescription data is provided when the wearer of the spectacle lens is looking through the spectacle lens.

In case of a free-form surface on the front surface of the spectacle lens the focal power resulting from the prescription data is typically realized through a suitable spherical or toric shape of the rear surface of the spectacle lens.

A main reason for providing a number of base curves is to provide a meniscus-like shape of the spectacle lenses, that is, with a convex front surface and a concave rear surface. The concave rear surface of the spectacle lens shall have typically a surface power between at least zero and typically not more than 10 diopter for the whole rear surface.

Usually, the number of base curves is limited to minimize the number of molds for forming semi-finished lens blanks and stocking costs. Therefore, typically the number of base curves is below 10.

As a result, each base curve is typically used for a domain of values of focal powers, where each domain includes intervals of the values of the different powers, for example, an interval of spherical power and an interval of cylindrical power. At the boarders of the domains, the base curve values representing the bending of the front surface show steps, which are typically in the order of one diopter as referred to the refractive index of 1.53. However, the steps may as well be larger than one diopter, for example 1.25 or 1.5 diopter.

There is a desire to choose the most suitable base curve for given prescription data and as-worn data. A method of choosing a suitable base curve out of a set of base curves is described in U.S. Pat. No. 8,313,194 B2. In this method, a customized base curve is selected from the list of base curves wherein the customized base curve is selected according to a customization criterion.

However, with advancing individualization of spectacle lenses finding suitable base curves is still an issue.

SUMMARY

It is an aspect of the disclosure to provide a computer-implemented method of determining at least one base curve value. In the description, the following terms are used as defined below.

"Spherical power" is a power of a spectacle lens that brings a paraxial pencil of parallel light to a single focus, where a paraxial pencil of parallel light is a pencil of light in which the distance of the light rays contained in the pencil of light from the optical axis is small and the angles of the rays of light with respect to the optical axis can be approximated according to sin α≈α.

"Astigmatic power" of a spectacle lens refers to the ability of a spectacle lens to bringing a paraxial pencil of parallel light to two separate line foci mutually at right angles. In this context, the term "principal meridian" refers to one of two mutually perpendicular meridians of a cylindrical power lens, which are parallel to the two lines of foci, where the term "meridian" refers to a plane which contains the center of curvature of a surface and the normal-vector at the center of curvature. Related to the astigmatic power is the "cylindrical power," which stands for the difference of powers in the two principal meridians. The direction of the principal meridian which is chosen as reference for the cylindrical power is called "cylinder axis."

"Prismatic power" refers to the value of the prismatic effect at the configured reference point as defined in DIN EN ISO 13666: 2013-10, section 10. DIN EN ISO 13666: 2013-10 is incorporated herein by reference.

The term "focal power" is used as a generic term for the terms "spherical power" and "astigmatic power" and the term "dioptric power" is used as a generic term for the terms "focal power" and "prismatic power."

The term "prescription data" or "individual prescription data" is used as a generic term for a set of optical characteristics of the spectacle lens like a value for the spherical power, a value for cylindrical power, a direction of the cylinder axis, and, if applicable, a value for the addition power as determined by an ophthalmologist or an optometrist in order to correct the individual vision of the wearer. In addition, the prescription may contain further values, like a value for the prismatic power, for example.

The term "as-worn position" refers to a position and orientation of the spectacle lens relative to the eyes and face during wear (see DIN ISO 13666:2013-10, section 9.15) and includes for example values for the back vertex distance, the face form angle, and/or the pantoscopic angle. The "face form angle" is the angle between the plane of the spectacle front and the plane of the right lens shape, or of the left lens shape, the term "pantoscopic angle" refers to an angle in the vertical plane between the normal to the first front surface of the spectacle lens at its boxed center, that is, at the intersection of the horizontal and vertical center lines, and the term "back vertex distance" refers to the distance between the apex of the cornea and the rear surface of the spectacle lens in a defined viewing direction (see DIN ISO 13666: 2013-10, sections 5.27 and 17).

The term "frame data" includes the geometry of the spectacle frame and the coordinates of the centration point (see DIN ISO 13666:2013-10, section 17). Further, the term "frame data" may include 3D data of the frame, e.g., of the frame groove and the frame rim, respectively or the front edge of a demonstration lens.

Further, the term "frame data" may include the boxing system or the boxed lens system, i.e., the system of measurement and definitions based on the rectangle formed by the horizontal and vertical tangents to the extremities of the lens or lens blank (see DIN ISO 13666:2013-10, section 5.1).

In case of one base curve, the term "base curve" is defined in this context from the radius r (in mm) of the mean curvature of a surface, typically of the front surface of a spectacle lens, and from the nominal refractive index n=1.53 as follows:

$$\text{Base curve} = \frac{1000(n-1)}{r},$$

unless otherwise defined.

In case of more than one base curves, the term base curve is defined in this context from the radii (in mm) of the mean curvatures of a surface, typically of the front surface of a spectacle lens, in different sections. Typically, in case of more than one base curve, the term base curve is defined in this context from the radii (in mm) of the mean curvature of a surface, typically of the front surface of a spectacle lens, in as many as different sections (through a reference point on the surface) as base curves, unless otherwise defined.

In case of two base curves the term base curve is defined in this context from the two radii $r_{min}$ and $r_{max}$ (both in mm) from the mean curvatures of the two sections of the surface through a reference point on the surface with minimum and maximum mean curvature, typically of the front surface of a spectacle lens, as follows:

$$\text{Base curve } 1 = \frac{1000(n-1)}{r_{min}}, \text{ base curve } 2 = \frac{1000(n-1)}{r_{max}},$$

n=nominal refractive index, n=1.53, unless otherwise defined.

The term "semi-finished spectacle lens blank" refers to a spectacle lens element having only one optically finished surface (see DIN ISO 13666:2013-10, section 8.4.2).

The term "spectacle lens blank" or "finished lens" refers to a spectacle lens element of which both sides of the lens element have their final optical surface (see DIN ISO 13666:2013-10, section 8.4.6).

The functional relationship is a real function as it is defined in mathematics. The functional relationship is typically a continuous functional relationship.

A continuous functional relationship means a real continuous function as it is defined in mathematics: the function f is continuous at a point h of its domain D, if for every sequence $(x_n)$ in D, that tends toward h, the sequence $f(x_n)$ always converges to f(h), that is, $f(x_n) \rightarrow f(h)$.

According to a first aspect of the present disclosure, a computer-implemented method of determining a base curve value representing a base curve for a front surface of a spectacle lens is provided. The method includes a step of receiving prescription data, for example, through manual input by use of a human-machine interface such as a keyboard, a voice recognition unit, a touch screen, et cetera, or through an electronic interface, as described for example in EP3410178 or in EP3355100. From the received prescription data, the base curve value is calculated for the individual prescription data based on a continuous, non-constant functional relationship between at least one value included in the prescription data on the one side and the base curve value on the other side.

In an exemplary embodiment of the computer-implemented method of determining a base curve value the prescription data comprises at least a value for spherical power. Alternatively, the computer-implemented method of determining a base curve value comprises at least a value for spherical power and a value for cylindrical power or spherical power and object distance, typically spherical power and variable object distance, or spherical power and cylindrical power and optionally object distance or spherical power and cylindrical power and axis and optionally object distance or spherical power and prismatic power and optionally object distance or spherical power and cylindrical power and prismatic power and optionally object distance, each value included in the individual prescription data for far vision and/or near vision.

In this case calculating the base curve value may include calculating the base curve value based on a functional relationship between the value for spherical power contained in the prescription data on the one side and the base curve value on the other side, or on a functional relationship between values for spherical power and cylindrical power contained in the prescription data on the one side and the base curve value on the other side. In this case possible values for spherical power and cylindrical power which may be included in the prescription data may form at least two domains of values. Then, the functional relationship, typically the continuous functional relationship, between values included in the prescription data and the base curve value may depend on the domain of the values for spherical power and cylindrical power each for far vision and/or near vision contained in the individual prescription data are part of.

In a further exemplary exemplary embodiment of the computer-implemented method of determining a base curve value the method may further comprise receiving as-worn position data and/or frame data and taking into account the received as-worn position data and/or the received frame data when calculating the base curve value. Like the individual prescription data the as-worn position data and/or frame data may be received from manual input through human machine interface, from an electronic interface, et cetera. For example, the face form angle may be used to increase the base curve value resulting from the individual prescription data, i.e., a higher face form angle may lead to a higher base curve value, resulting in a better fit of the spectacle lens to the face form of the wearer. In another example, the minimum curvature of the rear surface of a spectacle lens element is constant for a domain of prescription data, for example, a set of combinations of spherical and cylindrical data, typically for prescription data with sphere≥0 and the base curve results from the dioptric requests of the individual prescription data and optionally the data of the as-worn position and optionally the frame data resulting in thin, flat and aesthetic spectacle lenses for the whole domain of individual prescription data.

According to a second aspect of the present disclosure a computer-implemented method of determining at least one base curve value representing a base curve for a front surface of a spectacle lens is provided. The method includes a step of receiving frame data, for example, through manual input by use of a human-machine interface such as a keyboard, a voice recognition unit, a touch screen, et cetera, typically through an electronic interface, as described for example in EP3410178 or in EP3355100. From the received frame data the at least one base curve value is calculated. The at least one base curve value may be calculated from i) the fit of a sphere to a curve or to points of a curve that represents the frame rim data or
ii) the fit of a torus to a curve or to points of a curve that represents the frame rim data or
iii) the fit of a surface, typically a freeform surface, to a curve, or to points of a curve that represents the frame rim data.

The curve or curve data may be obtained by measuring points of e.g., on the front edge of the demonstration lens or on the front surface of the frame rim or the inner edge of the front surface of the frame rim or the groove of the frame. The demonstration lens is defined in DIN EN ISO 13666:2013-10, section 17.1, note 1. As device for obtaining the measuring points a centration device such as the i.Terminal 2 or the ZEISS VISUFIT 1000 (both company Carl Zeiss Vision) may be used. Typically, the curve is obtained by measuring points of the front surface of the frame rim, particularly typically the curve is obtained by measuring points of the front surface of the frame rim by a centration device.

In the following the above mentioned possible calculations of the at least one base curve are described in detail:

a) Calculating one base curve value from the fit of a sphere to a curve, typically a 3D curve, or to points of a curve, typically a 3D curve, that each represents the frame rim data.

From the curve or curve data points may be selected that represent the curve or curve data.

Determining a sphere that fits, typically best fits, to these selected points and calculating the base curve value from the radius of this sphere. Best fit of a sphere to a curve means determining radius and center of a sphere that minimizes the sum of the distances of the selected points or the sum of the squares of the distances of the selected points to this sphere. Typically best fit of a sphere to a curve means determining radius and center of a sphere that minimizes the sum of the squares of the distances of the selected points to this sphere. With the determined radius r the base curve value is $$\frac{1000(n-1)}{r}$$

wherein n is the nominal refractive index n=1.53.

b) Calculating two base curve values from the fit of a torus to a curve, typically a 3D curve, or to points of a curve, typically a 3D curve, that represents the frame rim data.

From the curve or curve data points may be selected that represent the curve or curve data.

Determining a torus that fits, typically best fits, to these selected points, and calculating the base curve value from the radii of this torus. Particularly typical is determining a torus with the minimum radius in horizontal or vertical direction, that fits, typically best fits, to these curve data and calculating the base curve value from the radii of this torus. The horizontal and vertical direction, respectively, refers either to the plane of the spectacle front or the plane of the lens shape, typically the plane of the lens shape. Best fit of a torus to a curve means determining the two main radii, the vertex and the axis of the torus that minimizes the sum of the distances of the selected points or the sum of the squares of the distances of the selected points to this torus. Typically best fit of a torus to a curve means determining the two main radii, the vertex and the axis of the torus that minimizes the sum of the squares of the distances of the selected points to this torus.

With the determined two main radii $r_{min}$ and $r_{max}$ the two base curve values are $$\frac{1000(n-1)}{r_{min}} \text{ and } \frac{1000(n-1)}{r_{max}},$$

nominal refractive index, n=1.53.

c) Calculating one or two base curve values from the fit of a surface, typically a freeform surface, to a curve, typically a 3D curve, or to points of a curve, typically a 3D curve, that represents the frame rim data and from a first and/or a second given base curve value.

From the curve or curve data points may be selected that represent the curve or curve data.

Determining a surface, typically a freeform surface, that fits, typically best fits, to these selected points, and fits, typically best fits, to a sphere or a torus, typically in a specified domain. Typically, the radius of the sphere is $$\frac{1000(n-1)}{\text{given base curve value}}.$$

Typically, the radii of the torus are $$\frac{1000(n-1)}{\text{given base curve value 1}} \text{ and } \frac{1000(n-1)}{\text{given base curve value 2}}.$$

The given base curve value, the given base curve value 1, and the given base curve value 2 each may for example be obtained from a fit of a sphere or a torus to the frame data, as described above with respect to item a) and item b), respectively. Alternatively, the given base curve value, the given base curve value 1, the given base curve value 2 each may result from individual prescription data for example. Typically, the specified domain is the domain within the rim or a circular disk with the center within the rim, typically the center being the boxed center according to DIN EN ISO 13666:2013-10, section 5.4.

The one or two base curve values of a freeform surface are obtained by a best fit of a sphere or a torus to the freeform surface within a given domain. Then the one base curve value is $$\frac{1000(n-1)}{r},$$

wherein the radius $r$ is the radius of this best fit sphere and $n$ is the nominal refractive index $n=1.53$. The two base curve values are $$\frac{1000(n-1)}{r_{min}} \text{ and } \frac{1000(n-1)}{r_{max}},$$

wherein the radii $r_{min}$ and $r_{max}$ are the radii of the best fit torus and $=1.53$.

For example, the best fit for one base curve value is done as follows: Determining a freeform surface which minimizes the sum of the squares of the distances of the selected points to the freeform surface plus the weighted square of the difference of the given base curve value to the base curve value of the freeform surface.

For example, the best fit for two base curve values is done as follows: Determining a freeform surface which minimizes the sum of the squares of the distances of the selected points to the freeform surface plus the weighted squares of the differences of the given two base curve values to the two base curve values of the freeform surface.

According to a third aspect of the present disclosure a computer-implemented method of determining at least one base curve value representing a base curve for a front surface of a spectacle lens is provided. The method includes the receiving of the frame data and the at least one base curve value bc1 and optionally bc2 determination from the frame data according to the second aspect, or the at least one base curve value bc1 and optionally bc2 may be given values, typically by external input. Furthermore, the method includes a step of receiving prescription data, and optionally the as-worn position, for example, through manual input by use of a human-machine interface such as a keyboard, a voice recognition unit, a touch screen, et cetera, or through an electronic interface, as described for example in EP3410178 or in EP3355100. From the received prescription data and optionally the as-worn position at least one minimum base curve value $bc_{min}$ and at least one maximum base curve value $bc_{max}$ are calculated for the individual prescription data based on a first continuous, non-constant functional relationships between at least one value included in the prescription data and optionally as-worn position on the one side and the at least one minimum base curve value $bc_{min}$ on the other side respectively based on a second continuous, non-constant functional relationships between at least one value included in the prescription data and optionally as-worn position on the one side and the at least one maximum base curve value $bc_{max}$ the other side. Typically, $bc_{min}$ is $\leq bc_{max}$ with respect to the identical value to be used from the individual prescription data.

Typically, the functional relationship for the minimum base curve value may be chosen to avoid a convex back surface and the functional relationship for the maximum base curve value may be chosen to avoid a too steep back surface that is to avoid a lens with a too curved back surface for aesthetic reasons or for manufacturing reasons. The at least one minimum and maximum base curve values $bc_{min}$ and $bc_{max}$ may be different for different manufacturing processes, for example for different types of freeform surfaces.

If the calculated base curve from the frame data obtained as described above in the second aspect is represented by only one base curve value bc1 and if bc1 fulfills the condition $bc_{min} \leq bc1 \leq bc_{max}$, then bc1 is the determined base curve value. If $bc1 < bc_{min}$ then the determined base curve is $bc_{min}$ and if $bc1 > bc_{max}$ then the determined base curve is $bc_{max}$.

If the calculated base curve from the frame data obtained as described above in the second aspect is represented by two base curve values bc1 and bc2. If $bc_{min} \leq bc1 \leq bc_{max}$, then bc1 remains the determined base curve value bc1'. If $bc1 < bc_{min}$, then bc1' is set to $bc_{min}$, if $bc1 > bc_{max}$ then bc1' is set to $bc_{max}$. If $bc_{min} \leq bc2 \leq bc_{max}$, then bc2 remains the determined base curve value bc2'. If $bc2 < bc_{min}$, then bc2' is set to $bc_{min}$, if $bc2 > bc_{max}$ then bc2' is set to $bc_{max}$.

Optionally, if the at least one base curve value is obtained from the frame data as described in aspect 2 with respect to item c), then typically the given base curve values from aspect 2 item c) are the base curve values obtained from the prescription data.

According to a fourth aspect of the present disclosure this objective is obtained by a method of manufacturing a spectacle lens, typically individually adapted to a wearer, where the method comprises the steps of:

providing individual prescription data and optionally individual as-worn position data for the spectacle lens to be manufactured;

determining a base curve value for the front surface of the spectacle lens element based on the individual prescription data and optionally based on the individual as-worn position data according to aspect 1 or based on the frame data according to aspect 2 or based on the individual prescription data and frame data according to aspect 3;

providing a spectacle lens element with a front surface and a rear surface; and machining the spectacle lens element based on the individual prescription data and optionally based on the individual as-worn position data;

wherein determining the base curve value is done by calculating it from the received individual prescription data based on a continuous, non-constant functional relationship between at least one value included in the individual prescription data and the base curve value, wherein the at least one value included in the individual prescription data comprises at least spherical power and object distance or spherical power and cylindrical power and optionally object distance or spherical power and cylindrical power and axis and optionally object distance or spherical power and prismatic power and optionally object distance or spherical power and cylindrical power and prismatic power and optionally object distance, each value included in the individual prescription data for far vision and/or near vision or determining the base curve value is done by calculating it from the received frame data according to aspect 2, or determining the base curve value is done by calculating it from the received individual prescription data and the received frame data according to aspect 3 and providing the spectacle lens element includes determining the front surface and the rear surface of the spectacle lens element so as to obtain the spectacle lens with at least one base curve with the at least one determined base curve value on the front surface.

Individually adapted to a wearer means that the optical correction of the vision of the wearer is performed by using the individual prescription data and optionally the data of the as-worn position.

According to an aspect of the present disclosure the machining of the spectacle lens element includes machining of the front surface and/or the rear surface of the spectacle lens element so as to obtain the spectacle lens with a base curve with the determined base curve value on the front surface.

According to an exemplary embodiment, the base curve value is determined by using an inventive computer-implemented method of determining a base curve value.

In particular, the rear surface of the lens element is calculated and machined such that the spectacle lens typically in its as-worn position has a dioptric power according to the prescription data.

The method of manufacturing a spectacle lens individually adapted to a wearer may, in particular, be applied in manufacturing spectacle lenses which are progressive addition lenses. In this case, it may be advantageous to form a progressive surface of the progressive addition lens on the front surface of the spectacle lens element.

In an exemplary embodiment of the method of manufacturing a spectacle lens individually adapted to a wearer frame data containing data about the geometry of the spectacle frame is provided and machining the spectacle lens element is also based on the frame data.

According to a fifth aspect of the present disclosure, a computer program is provided with program code for performing the method steps according to the computer-implemented method of determining a base curve value representing a base curve for a front surface of a spectacle lens when the computer program is loaded or executed in a computer.

The disclosure provides methods of determining continuous base curve values as a function of parameters in the prescription data and to manufacture the respective base curves by machining the front surface and/or the rear surface of a spectacle lens element like a spectacle lens blank or a semi-finished spectacle lens blank. This allows to avoid steps between the base curve values related to values contained in the prescription data which differ only slightly from each other. Using a base curve chart as it is done in the related may lead to the situation that values contained in the prescription data, for spherical power, for example, which differ only slightly from each other lead to the selection of different base curve values which can differ by one diopter or more at a refractive index of 1.53.

In an exemplary embodiment of the disclosure, the minimum curvature of the rear surface of a spectacle lens element is constant for a domain of prescription data, for example, a set of combinations of spherical and cylindrical data, typically for prescription data with sphere≥0 and the base curve results from the dioptric requests of the individual prescription data and optionally the data of the as-worn position and optionally the frame data resulting in thin, flat, and aesthetic spectacle lenses for the whole domain of individual prescription data.

BRIEF DESCRIPTION OF THE DRAWINGS

The disclosure will now be described with reference to the drawings wherein.

DESCRIPTION OF EXEMPLARY EMBODIMENTS

Figure 1:
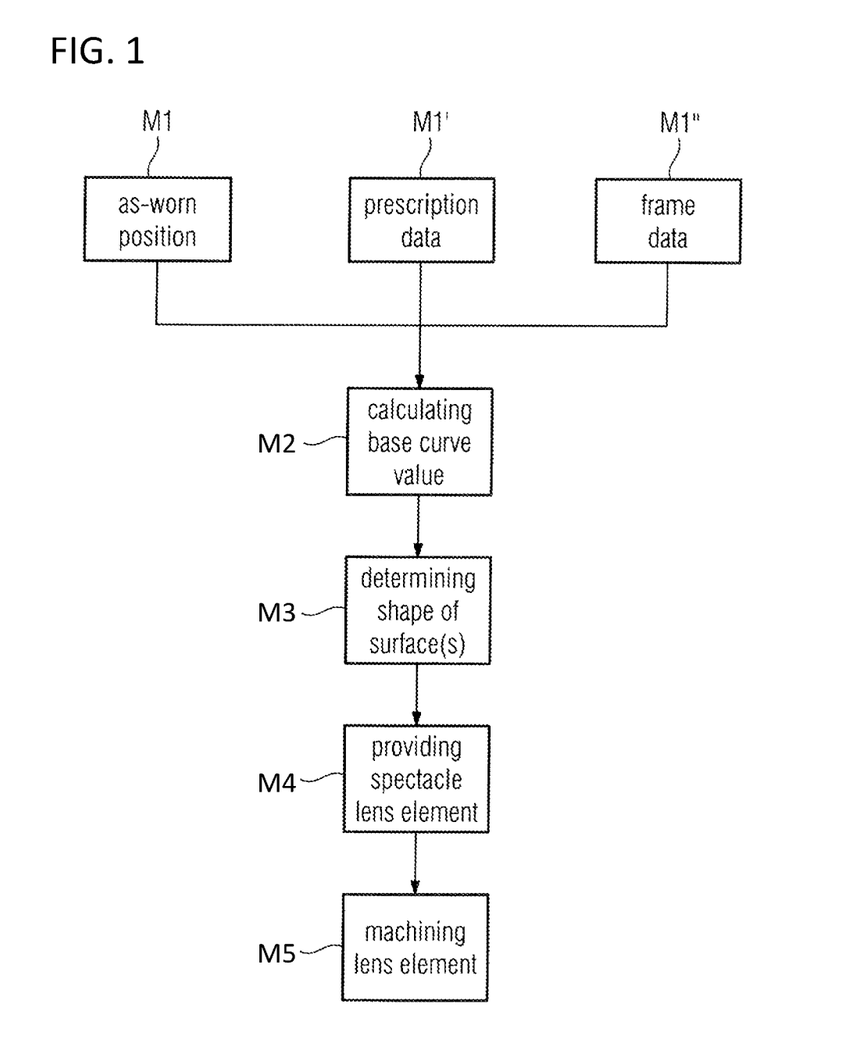
FIG. 1 shows a flowchart showing how a spectacle lens individually adapted to a wearer is manufactured.

A detailed description of an exemplary embodiment of an inventive method of manufacturing a spectacle lens individually adapted to a wearer will be described with reference to the flowchart shown in FIG. 1.

In the method, individual prescription data of the wearer as well as individual as-worn position data of the wearer are provided in steps M1 and M1'. In addition, frame data are also provided in step M1". In the present exemplary embodiment, the prescription data contains values of spherical power and cylindrical power together with an indication of the direction of the cylinder axis, where the values of spherical power and cylindrical power may also include zero so that the spectacle lens resulting from an inventive method may have a spherical power of 0 diopter or an cylindrical power of 0 diopter. However, in the general case the prescription data contains a non-zero value for spherical power and a non-zero value for cylindrical power. In addition to the values for spherical power and cylindrical power the prescription data may contain additional values, i.e., a value for representing addition power and/or a value representing prismatic power. The as-worn position data contains in the present exemplary embodiment a value for the back vertex distance, a value for the pantoscopic angle, and a value for the face form angle and the frame data contains data relating to the geometry of the spectacle frame.

In a next step M2, a base curve value representing a base curve for the spectacle lens to be manufactured is determined. The base curve value is a measure for the nominal surface power to be given to the front surface of the spectacle lens. According to the exemplary embodiment, the base curve value—and thus the base curve, is determined based on the combination of values given in the prescription data and, if applicable, in the as-worn position data and/or in the frame data. How the base curve value is determined will be described later with respect to the flowchart of FIG. 2. The nominal surface power of the front surface does not need to be the exact final surface power of the front surface if the free-form surface is formed on the front surface.

Next, in step M3 the shapes of the front and rear surfaces of the spectacle lens are determined. In the present exemplary embodiment, a free-form surface is to be formed on the front surface. In this case, a suitable spherical or toric rear surface is determined such that the free-form surface on the front surface has an average curvature, that is, a curvature averaged over the whole surface, or a mean curvature at a reference point of the front surface, which leads to a surface power that approximately matches the base curve value. Determining the spherical or toric rear surface typically is done iteratively by means of ray tracing. In the ray tracing process, a starting geometry of the spectacle lens is given. The starting geometry may include as front surface a known free-form front surface or a spherical front surface, which has the required base curve value, and as rear surface a given spherical or toric surface. Then, the spherical or toric rear surface is varied until the calculated power of the spectacle lens coincides with the required power for correcting the ametropia of the wearer, typically with the spectacle lens being in the as-worn position. With the so determined spherical or toric rear surface, the free-form surface is optimized using ray-tracing. During this optimization, the average curvature or mean curvature, respectively, does not change significantly anymore, so that the front surface keeps the required base curve value.

Next, in step M4 a lens element is provided which has a front surface and a rear surface. The lens element may be a spectacle lens blank or a semi-finished spectacle lens blank. In a semi-finished spectacle lens blank, the front surface usually has one of a number of surface powers which may be chosen such that the surface power of the front surface corresponds to the determined base curve value as closely as possible. However, it is not mandatory to provide a semi-finished spectacle lens blank with a surface power of its front surface which corresponds to the base curve value. In particular, instead of a semi-finished spectacle lens blank a spectacle lens blank with flat front and rear surfaces, that is, a cylindrical spectacle lens blank, may be used as well.

The only restriction is, that the spectacle lens blank needs to be thick enough to allow manufacturing the spectacle lens with the determined base curve.

Once the base curve value is determined, the shapes of the front and rear surfaces of the spectacle lens are determined and the spectacle lens element is provided, the spectacle lens element is machined in step M5 based on the prescription data and the as-worn position data so as to form a front surface and a rear surface having the determined shapes, such that a spectacle lens is formed that is individually adapted to the wearer. Machining the spectacle lens element includes for example machining the front surface so as to form the base curve represented by the determined base curve value on the front surface. In case the spectacle lens to be manufactured is a single vision lens or a progressive power lens with the free-form surface formed on the rear surface the rear surface will be machined according to the prescription data so as to form a rear surface which together with the front surface allows the spectacle lens to fulfill the individual optical needs given in the prescription data.

If, on the other hand, the spectacle lens is a progressive addition lens with the free-form surface formed on the front surface, the front surface is machined according to numerical data describing the free-form surface. This numerical data is based on the individualized power to be achieved and optionally on the as-worn position. It is also possible to form in addition to the free-form surface on the front surface a further free-form surface on the rear surface. Then both free-form surfaces together provide for the addition power of the progressive addition lens.

The machining performed in step M5 may include milling and polishing the front surface and/or the rear surface under computer numeric control for producing the free-form surface and fine turning on which follows a polishing step. After the lens has been machined, one or more coatings may be applied on one or more of the spectacle lens surfaces.

Figure 2:
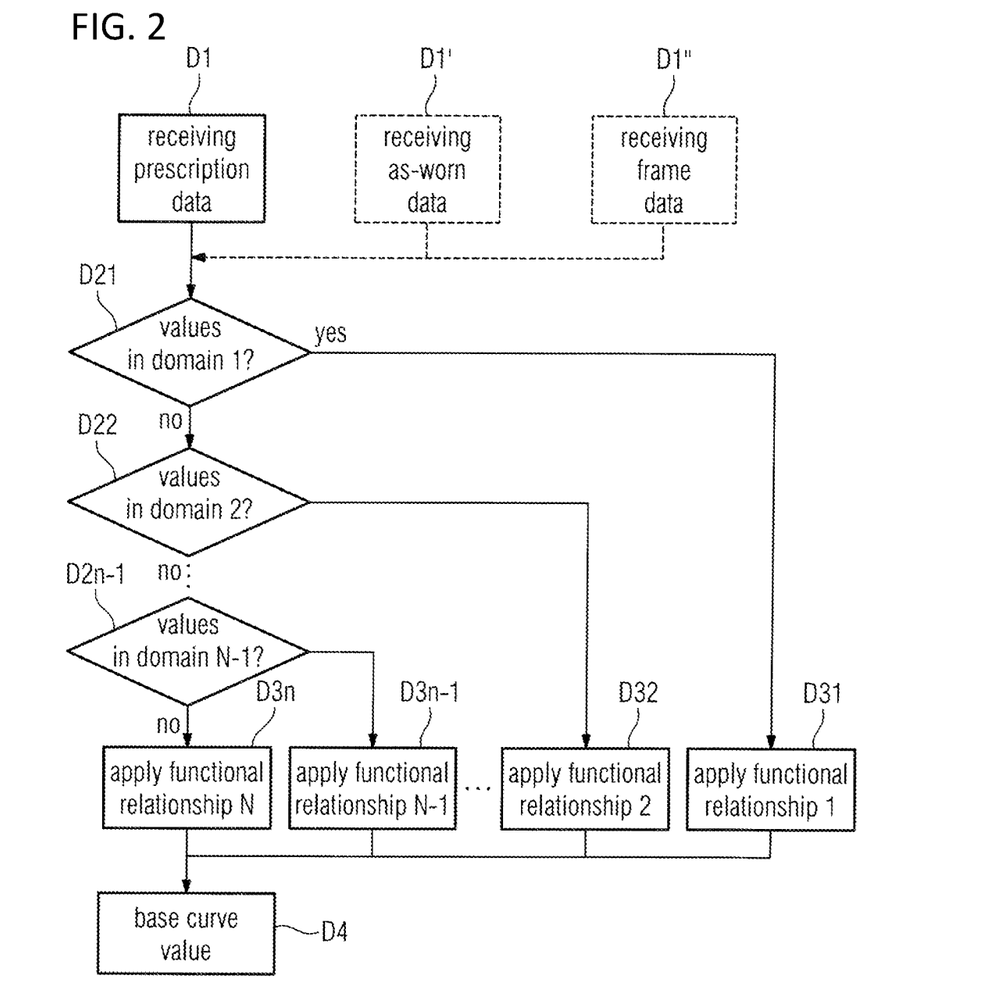
FIG. 2 shows a flowchart showing how a base curve for a spectacle lens is determined.

FIG. 2 shows the method of determining a base curve value for the spectacle lens. In the present exemplary embodiment, the method is implemented on a computer and comprises the step of receiving prescription data (step D1) through a computer interface. In addition, an optional step of receiving as-worn position data (step D1') through the computer interface and/or an optional step of receiving frame data (step D1") with data relating to the geometry of the spectacle frame through the computer interface may be present.

Next, in step D21 the program evaluates the values contained in the prescription data to see whether these values belong to one of a number of domains the values in the prescription data may be in. In the present exemplary embodiment, the base curve value is determined based on the values of spherical power and cylindrical power given in the prescription data. The spherical power may assume values between −8 diopter and +7 diopter and the cylindrical power may assume values between 0 and +4 diopter. A first domain of values of the prescription data contains, in the present exemplary embodiment, all combinations of values for spherical power and cylindrical power in which the spherical power is below −7 diopter. If it is determined in step D21 that the value for spherical power given in the prescription data is below −7 the method proceeds to step D31 in which a functional relationship between the spherical power on the one side and the base curve value on the other side is applied to determine the base curve value from the value of the spherical power. The functional relationship used in step D31 is valid for all values of the prescription data which are in the first domain.

If, on the other hand, it is determined in step D21 that the value for the spherical power is not below −7, the method proceeds to step D22 in which it is determined whether the combination of the value for spherical power and the value for cylindrical power given in the prescription data is in the second domain. The second domain contains all combinations of values for spherical power and cylindrical power in which the value for spherical power is between −7 and −4.75. In case the spherical power is in this interval, the method proceeds to step D32 in which a second functional relationship is applied which relates the value of the spherical power to the base curve value. In case the spherical power is not in the interval between −7 diopter and −4.75 diopter, the method proceeds to a further step in which it is determined whether the values given in the prescription data lie in a third domain. This proceeds until all n domains have been checked and the values given in the prescription data have been associated to one of the domains. In other words, the method determines to which domain the values the combination of spherical power and cylindrical power given in the prescription data belongs and applies the corresponding functional relationships between the value spherical power and the base curve value or between the spherical power and the cylindrical power and the base curve value. At the end, the determined base curve value is output in step D4.

An example for a program code by which the domain the combination of spherical power and cylindrical power given in the prescription data belongs to and the base curve value can be determined based on the values of spherical power and cylindrical power given in the prescription data is, for example

```
if (fSph < −7.00) then
    fGK = 1.00+(8.00+fSph)*0.40/1.00
elseif (fSph < −4.75) then
    fGK = 1.40+(7.00+fSph)*0.90/2.25
elseif (fSph < −3.00) then
    fGK = 2.30+(4.75+fSph)*0.90/1.75
elseif ((fSph < −1.50).and.(fSph+fZyl < 1.50)) then
    fGK = 3.20+(3.00+fSph)*0.80/1.50
    if (fSph+fZyl > 1.00) fGK = fGK+.30*(fZyl−3.00)
elseif (fSph+fZyl < 1.50) then
    fGK = 4.00
elseif ((fSph+fZyl < 4.50)) then
    fGK = 4.00+(fSph+fZyl−1.50)*2.50/3.00
else
    fGK = 6.50+(fSph+fZyl−4.50)*1.00/2.50
endif
``` where fGK stands for the base curve value in diopter, fSph stands for the value of the spherical power in diopter of the prescription data and fZyl stands for the cylindrical power in diopter of the prescription data.

Figure 3:
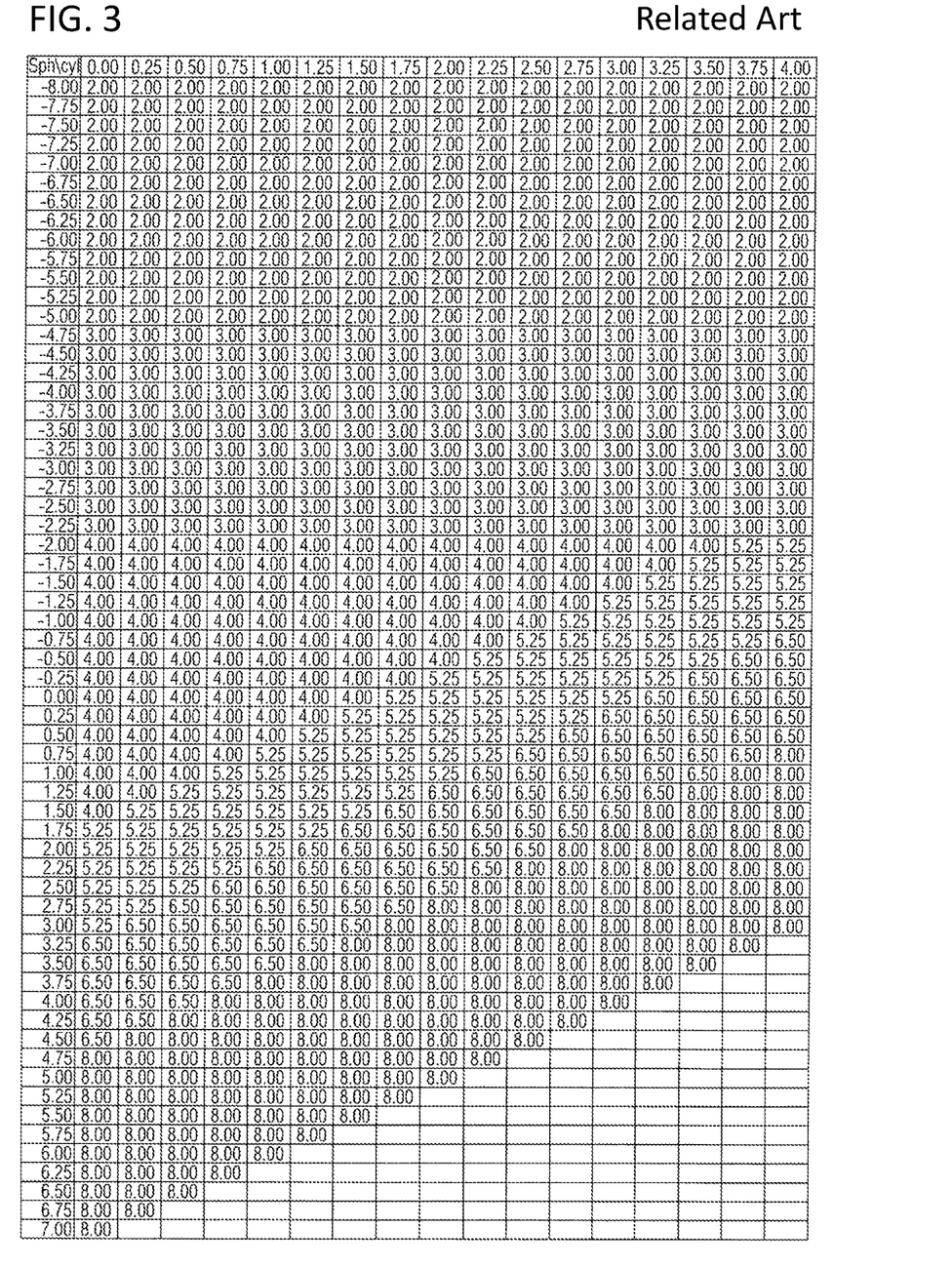
FIG. 3 shows a base-curve selection chart according to the related.
Figure 4:
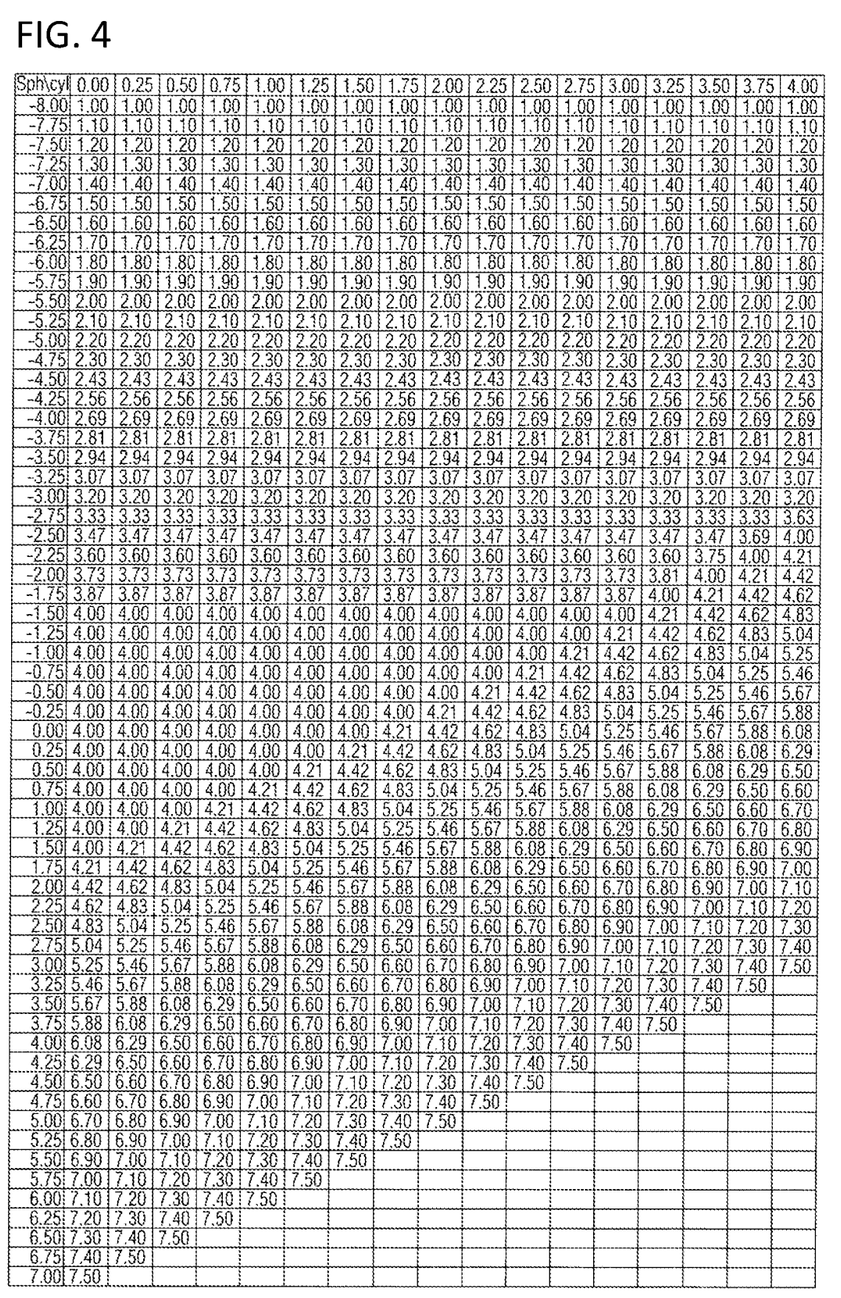
FIG. 4 shows a chart with base curves values calculated according to the present disclosure.

FIG. 3 shows a base curve chart according to the related art showing base curve values for combinations of spherical power and cylindrical power with the spherical power being in the range of −8 to +7 diopter and the cylindrical power being in the range of 0 to 4 diopter. FIG. 4 shows for the same combinations of values for spherical power and cylindrical power the base curve values determined by use of the above program code. The base curve values provided in FIGS. 3 and 4 are based on the organic material with a refractive index of 1.50, for example, poly(allyl diglycol carbonate) also known as CR39.

As can be seen from FIG. 3, in the related art base curve chart there are steps between neighboring values of spherical power and/or cylindrical power which are one diopter or more at a refractive index of 1.53. For example, in the base curve chart shown in FIG. 3, the base curve value for a spherical power of 1.25 diopter and a cylindrical power of 0.50 diopter would be 5.25 diopter, whereas the base curve value for a spherical power of 1.00 diopter and a cylindrical power of 0.50 diopter would be 4.00 diopter. This means a step of 1.25 diopter is present between the spherical power of 1.00 diopter and 1.25 diopter. If, for example, the left and right lenses of a spectacle have spherical powers of 1.00 diopter and 1.25 diopter, respectively, and both have a cylindrical power of 0.50 diopter the base curve chart of the related would lead to a situation where the left spectacle lens would have a base curve value of 4.00 diopter and the right spectacle lens would have a base curve value of 5.25 diopter. In other words, the left and right spectacle lenses would look rather different although the difference in spherical power is rather small. In the chart showing the base curve values as calculated by the above program code the differences in the base curve values of neighboring values of spherical power and/or neighboring values of cylindrical power are always small. For example, for the prescription data with a value of 1.25 diopter for the spherical power and a value of 0.5 diopter for the cylindrical power, a method according to the disclosure provides a base curve value of 4.21 diopter, and for a value of 1.00 diopter for the spherical power and a value of 0.50 diopter for the cylindrical power the inventive method provides a base curve value of 4.00 diopter (see FIG. 4). Hence the difference is only 0.21 diopter as compared to 1.25 diopter in the related base curve chart. Such a small difference is barely visible in the finished spectacle lenses. Hence, the disclosure allows for producing more aesthetic spectacles.

In general, aesthetic reasons lead to the desire to have the base curve for higher positive spherical powers as flat as possible. With the inventive method flatter base curves can be achieved. For example, assume a spherical power of 4.00 diopter with a cylindrical power of 0.75 diopter. According to the related base curve chart shown in FIG. 3 this would lead to a base curve of 8.00 diopter. According to an inventive method a base curve of 6.60 would be sufficient. Furthermore, sometimes spectacle glasses with a desired base curve are ordered. If, for example a spectacle lens is ordered with a spherical power of 3.25 diopter and a cylindrical power of 0 diopter with a desired base curve of 5.5 diopter, the related base curve chart of FIG. 3 would lead to a base curve of 6.5 diopter because the base curve of 5.25 diopter would already be too flat for producing the spectacle lens. With the inventive method, a base curve of 5.46 diopter would be provided which matches the desired base curve very closely.

With the inventive method, a base curve chart with not normalized values (for example not normalized to a step size of 0.25 diopter) may also be generated.

In the chart of FIG. 4, the spherical power and the cylindrical power are given in steps of 0.25 diopter for comparing it with the base curve chart of FIG. 3. However, the values of spherical power and/or cylindrical power may be given in a continuous fashion or in much smaller steps than shown in the chart of FIG. 4. Of course determining the base curve value may also be done in the same way for values of spherical power and/or cylindrical power that are given in steps that are smaller than 0.25 diopter, for example for values that are given in steps of 0.01 diopter, or even less.

Furthermore, the method offers the possibility to adapt the base curve on the front surface in an optimal fashion to the prescription data, the as-worn position and the data of the spectacle frame. In particular, orders for positive spherical power and positive cylindrical power often contain very flat base curves for aesthetic reasons. The requirements of the bending of the rear surface (for example given through a minimum value) may include the absolute surface power of the rear surface over the whole surface or almost the whole rear surface or a minimum value for the average curvature of the rear surface, that leads to a minimum bending, that is, a minimum base curve value of the front surface. Starting from the requirements of the bending of the rear surface can be determined such that the finished spectacle lens realizes the desired spherical and cylindrical power, the required bending of the rear surface and optionally the as-worn position. In this context the data of the spectacle frame influences a glass thickness of the spectacle lenses and thereby also the curvature required for the front surface and the rear surface. Hence, the disclosure allows for taking the frame data into account. The base curves values can then not be represented by a chart as shown in FIG. 4 because the base curve values also depend on the individual as-worn position and the data of the spectacle frame. However, in any case a suitable base curve can be calculated through a functional relationship taking into account not only spherical power and/or cylindrical power but also values of the as-worn position and of the frame data. In the end the wearer receives an aesthetically optimized spectacle glass, which only leads to a small magnification or small diminution of the visual perception of the eyes behind the spectacle lens.

The present disclosure has been described by use of specific exemplary embodiments of the disclosure for illustrative reasons only. A person skilled in the art is aware of possible deviations from the exemplary embodiments. For example, although eight functional relationships are used in the program code shown with respect to the present exemplary embodiment, a larger or smaller number of functional relationships could be used where the larger or smaller number of functional relationships comes along with a larger or smaller number of domains for the values given in the prescription data. Moreover, FIGS. 1 and 2 show the prescription data, the as-worn position data and the frame data to be provided/received simultaneously. However, it would also be possible to provide/receive these data serially in any possible order.

It is understood that the foregoing description is that of the preferred exemplary embodiments of the invention and that various changes and modifications may be made thereto without departing from the spirit and scope of the disclosure as defined in the appended claims.

What is claimed is:

1. A computer-implemented method of determining one base curve value or two base curve values representing a base curve for a front surface of a spectacle lens, the method comprising:
   receiving frame data including frame rim data;
   determining the one base curve value or the two base curve values for the front surface of the spectacle lens from the received frame data by:
   calculating the one base curve value or the two base curve values from the received frame data by a fit of a freeform surface to be formed on the front surface to a curve, or to points of the curve, which represents the frame rim data,
   wherein the one base curve value or the two base curve values are given by an average curvature of the freeform surface or a mean curvature of the freeform surface at a reference point;
   varying a curvature of the back surface until a calculated power of the spectacle lens coincides with a prescribed power for correcting an ametropia of a wearer of the spectacle lens with the average curvature or the mean curvature of the freeform surface to be formed on the front surface; and
   optimizing the freeform surface to be formed on the front surface by ray-tracing without changing the average curvature or the mean curvature, respectively, so that the front surface maintains the one base curve value or the two base curve values.

2. The computer-implemented method of claim 1, wherein the curve, or the points of the curve, which represents the frame rim data, is obtained by measuring points on a front edge of a demonstration lens or on a front surface of a frame rim or an inner edge of the front surface of the frame rim or a groove of a frame.

3. The computer-implemented method of claim 1, further comprising:
   selecting points from the curve, the selected points representing the curve;
   determining a freeform surface that fits to the selected points,
   calculating the one base curve value or the two base curve values from the determined freeform surface.

4. The computer-implemented method of claim 3, wherein determining the freeform surface that fits to the selected points includes determining the freeform surface that best fits to the selected points.

5. The computer-implemented method of claim 3, wherein determining the freeform surface that fits or best fits to the selected points includes determining the freeform surface that fits or best fits in a specified domain to the selected points.

6. A method of manufacturing a spectacle lens comprising:
   providing frame data including frame rim data for the spectacle lens to be manufactured;
   providing a spectacle lens element having a front surface and a rear surface;
   determining one base curve value or two base curve values for the front surface of the spectacle lens element based on the frame data by:
   calculating the one base curve value or the two base curve values from the received frame data by a fit of a freeform surface to be formed on the front surface to a curve, or to points of a curve, which represents the frame rim data,
   wherein the one base curve value or the two base curve values are given by an average curvature of the freeform front surface or a mean curvature of the freeform front surface at a reference point,
   varying a curvature of the back surface until a calculated power of the spectacle lens coincides with a prescribed power for correcting an ametropia of a wearer of the spectacle lens with the average curvature or the mean curvature of the freeform surface to be formed on the front surface;
   optimizing the freeform surface to be formed on the front surface by ray-tracing without changing the average curvature or the mean curvature, respectively, so that the front surface maintains the one base curve value or the two base curve values,
   wherein the providing the spectacle lens element includes determining the front surface and the rear surface of the spectacle lens element so as to obtain the spectacle lens with the one base curve or the two base curve values with the one determined base curve value or the two base curve values on the front surface; and
   machining the front surface and the rear surface of the spectacle lens element based on the frame data and on the one determined base curve value or the two base curve values on the front surface.

7. A computer program comprising:
a program code stored on a non-transitory computer readable medium;
the program code being configured to, when the computer program is loaded or executed in a computer:
receive frame data including frame rim data;
determine the one base curve value or the two base curve values for the front surface of a spectacle lens from the received frame data by:
  calculating the one base curve value or the two base curve values from the received frame data by a fit of a freeform surface to be formed on the front surface to a curve, or to points of the curve, which represents the frame rim data,
  wherein the one base curve value or the two base curve values are given by an average curvature of the freeform surface or a mean curvature of the freeform surface at a reference point;
  varying a curvature of the back surface until a calculated power of the spectacle lens coincides with a prescribed power for correcting an ametropia of a wearer of the spectacle lens with the average curvature or the mean curvature of the freeform surface to be formed on the front surface; and
  optimizing the freeform surface to be formed on the front surface by ray-tracing without changing the average curvature or the mean curvature, respectively, so that the front surface maintains the one base curve value or the two base curve values.

* * * * *

UNITED STATES PATENT AND TRADEMARK OFFICE
CERTIFICATE OF CORRECTION

| | | |
|---|---|---|
| PATENT NO. | : 12,228,803 B2 | Page 1 of 1 |
| APPLICATION NO. | : 16/657497 | |
| DATED | : February 18, 2025 | |
| INVENTOR(S) | : Markus Welscher et al. | |

It is certified that error appears in the above-identified patent and that said Letters Patent is hereby corrected as shown below:

In the Specification

In Column 5, Line 27: change "exemplary exemplary embodiment" to -- exemplary embodiment --

Signed and Sealed this
Twenty-fifth Day of March, 2025

Coke Morgan Stewart
*Acting Director of the United States Patent and Trademark Office*